United States Patent Office 2,929,795
Patented Mar. 22, 1960

2,929,795

BLEND OF SYNTHETIC RESINOUS COPOLYMER AND RUBBERY MATERIALS

Robert J. Reid, Canal Fulton, and Wendell R. Conard, Kent, Ohio, assignors to The Firestone Tire & Rubber Company, Akron, Ohio, a corporation of Ohio No Drawing. Application April 18, 1957
Serial No. 653,520

8 Claims. (Cl. 260—45.5)

This invention relates to a tough plastic blend of a synthetic resinous copolymer and rubbery materials. It has good impact strength, even at low temperatures in the neighborhood of zero (Fahrenheit), and is capable of post-forming.

The blend of this invention is composed largely of a polymeric resin and smaller amounts of two rubbers, one of which is solvent resistant, and the other of which improves the processing of the blend and gives it improved low-temperature characteristics. The larger the amount of the rubber, the less hard and rigid the blend. Blends which contain a large amount of rubber are sufficiently flexible to be formed into flexible sheeting. The blends which contain less rubber are quite hard and may be rigid, depending upon their rubber content. The blending of selected resins and rubbers gives the products high impact strength which in sheeting evidences itself by toughness.

There are three components in the blend. These are: (1) The resinous material which constitutes 50 to 90 percent of the final product. (2) A nitrile rubber which is essentially a copolymer of a nitrile monomer and a conjugated diene, but may comprise a third monomer. This forms 50 to 5 percent of the blend. (3) Another rubber which may be natural rubber or a polymeric synthetic derived largely or entirely from butadiene or other conjugated diene (e.g. isoprene, dimethylbutadiene, piperylene, etc.), and which will be more particularly described in what follows. As represented by the examples which follow, the preferred respective ranges in which the components are blended is 65 to 85 parts of the resin to 10 to 20 parts of the nitrile rubber to 5 to 15 parts of the other rubber, the parts being by weight.

The resin is quite brittle. It forms homogeneous blends with the rubbers, being nearly or entirely compatible therewith. It is formed from substantial amounts of methyl methacrylate and acrylonitrile, and a substantial amount of styrene may be included among the monomers used in forming it.

The harder blends—that is, those containing, for example, 65 or more percent of resin with up to 35 percent, of the rubbers—have high impact strength and can be used for toys, trays, tote boxes, and also as scuff panels at the bottom of the interior of automobile doors, etc. Sheeting which contains a higher percentage of rubbers is flexible at low temperatures and is characterized by its toughness. The sheeting contains a sufficient amount of butadiene-acrylonitrile copolymer to make it resistant to attack by petroleum products and quite generally resistant to organic solvents.

The resin is formed from 90 to 50 parts per hundred of the resin of methyl methacrylate and 10 to 50 parts of acrylonitrile, except that up to half of the methyl methacrylate may be replaced by styrene. Thus, the composition may be defined as composed of 90 to 50 parts per hundred of the resin of methyl methacrylate, 10 to 50 parts of acrylonitrile, with 45 to 25 parts of styrene, except that the sum of the parts of the methyl methacrylate and styrene equals 90 to 50 parts. The resin is hard and brittle, its exact properties depending upon its composition. Thus, an increase in the acrylonitrile content makes the heat distortion point higher and lowers the brittle point of the blend, although little change in other properties is noticed when the acrylonitrile content is raised from about 15 to 30 parts.

The nitrile rubber is a polymeric rubber which ordinarily is formed by copolymerization of 60 to 90 parts per hundred of the rubber of a conjugated diene (e.g. butadiene, isoprene, etc.), and 40 to 10 parts of an ethylenically unsaturated nitrile monomer, such as acrylonitrile, methacrylonitrile, and ethacrylonitrile. Lowering the content of the nitrile monomer in the rubber raises the heat distortion point of the blend and lowers its brittle point. Up to about 5 parts of the nitrile monomer might be replaced by a third monomer, e.g. methyl methacrylate, vinyl pyridine, methyl vinyl ketone, vinylidene chloride, and styrene. The nitrile rubber assists in rendering the resin and the other rubber compatible, and gives the blend the desired toughness.

The other rubber may be Hevea brasiliensis or a synthetic rubbery polymer or copolymer of a conjugated diene. It is this component of the blend that improves the processing of the blend. It prevents it from being brittle at low temperatures. This is done without sacrificing its stiffness and resistance to heat distortion at temperatures around room temperature. If a synthetic, this rubber is formed by homopolymerizing a conjugated diene (e.g. butadiene, isoprene, piperylene, dimethylbutadiene, etc.) or copolymerizing such a conjugated diene with up to 40 parts (based on a total of 100 parts of conjugated diene plus monomer) of one or more ethylenically unsaturated monomers from the class consisting of styrene, the mono-, and di-nuclearly methylated styrenes, alpha-methylstyrene, methyl methacrylate, ethyl acrylate, vinyl pyridine, methyl vinyl ketone, vinylidene chloride or other ethylenically unsaturated monomer, except a nitrile monomer. The rubbers obtained from nitrile monomers do not improve the processing properties of the blend, particularly at low temperatures. The blend does contain nitrile rubber, but for reasons already given.

A preferred third component is a rubbery copolymer of butadiene and styrene. Such copolymer with a lower styrene content than 30 parts per 70 parts of butadiene, as is usual in the rubber commonly known as GR–S, gives the blend better processing and low-temperature properties than GR–S.

The polymeric materials used in the blend are produced by usual emulsion polymerization procedures, using a free-radical-generating catalyst such as potassium persulfate, hydrogen peroxide, etc. The resulting latex is coagulated in any suitable manner, e.g. by procedures well known in the art. The resulting coagulum is then dried.

The resin and rubber may be blended by a variety of techniques and apparatus. Polymeric materials produced in the form of latexes may be blended by mixing the latexes and then coprecipitating them with a coagulant to form a homogeneous blend. Alternatively, the polymeric materials may be separately coagulated and then blended on a roll mill or in a Banbury mixer. The blending is preferably completed on a roll mill or in a Banbury mixer. Such mixing should preferably not be prolonged excessively, that is, it generally should not extend beyond 20 to 40 minutes under conventional conditions—less on a roll mill—in order to avoid discoloration and degradation of the blended components.

The following example illustrates the preparation of the resin:

EXAMPLE 1

The following materials are used:

| | Parts by weight |
|---|---|
| Water | 200 |
| Aquarex ME | 2.0 |
| Potassium persulfate | 0.5 |
| Sodium bicarbonate (anhydrous, reagent grade) | 0.25 |
| Methyl methacrylate | 78 |
| Acrylonitrile | 22 |
| Dodecyl mercaptan | 0.2 |

After flushing the cleaned reaction vessel with nitrogen, the emulsifier, persulfate, and catalyst are dissolved in the 200 parts of water. Then the monomers are introduced. The reaction is carried out under a positive nitrogen pressure of 5 to 10 pounds. The vessel is equipped with an agitator, and after starting it, the temperature is adjusted to about 105° F. during the induction period of 30 minutes to 4 hours, and should not rise above 125° F. during the entire polymerization procedure, which occupies about 20 hours. During polymerization it is preferably maintained at about 100–115° F. The polymerization is continued to completion, when a solids content of over 30 percent is present. The solids will increase to approximately 33 percent on storage. It is advisable to determine the solids content of the latex product just before mixing with a different latex to form a blend. The copolymer latex is stored in a clean drum until used.

The molecular weight of the resin may be modified by chain-transfer agents, such as the mercaptan of the foregoing formula. However, it is not necessary to so modify the reaction. The modified resins have a better hot strength than the unmodified resins.

The water used is a demineralized water or condensate. Other detergents than Aquarex ME (sodium lauryl sulfate) may be used or soap flakes may be employed. The monomers may be reacted in different proportions. The resin may be prepared by other processes and, of course, the ratio of the monomers may be varied. Terpolymer for use in the blend, as herein contemplated, may be prepared according to the foregoing example, by replacing up to half of the methyl methacrylate by styrene. The various conditioning agents which are included in the formula may be added in aqueous solution or dispersion, keeping the total water present in the final reaction mix at substantially 200 parts.

A plastic for embossed sheets having high impact strength for vacuum-forming into scuff panels for automobile doors was prepared by blending 65 parts of the resin latex with 20 parts of latex of butadiene-acrylonitrile copolymer (75:25) and 15 parts of latex of butadiene-styrene copolymer (70:30), giving a solids blending ratio of 65 parts of resin to 35 parts of rubber. These copolymers were prepared by procedures usual in the art. The blended latexes, after coagulation and drying, were milled 20 minutes at 100 pounds per square inch gauge steam, sheeted off about 80 mils thick, and then press-polished at 180° C.

Variation in the properties of a blend resulting from using different proportions of the three components is illustrated in the following table which records the properties of three different blends. Blend A is that of the foregoing example, and Blends B and C contain different proportions of the three components. Under "Composition," the ratio of the different components in each of the three blends is given. The next column records the hardness. The modulus is given in pounds per square inch. "Heat Distortion" refers to the temperature in degrees centigrade at which a standard sample starts to bend under given conditions of load, etc. The "Izod Impact" was determined at room temperature, and is given in foot pounds per inch of notch.

| Blend | Composition | Rockwell R | Flexural modulus | Heat Distortion, °C. | Izod Impact |
|---|---|---|---|---|---|
| A | 65/20/15 | 55 | 165,000 | 76 | 4.3 |
| B | 75/15/10 | 87 | 280,000 | 78 | 3.5 |
| C | 85/10/5 | 94 | 390,000 | 81 | 1.2 |

The harder blends are preferred for extrusion and injection molding for the manufacture of pipes, pipe fittings, toys, housewares, etc. The softer blends are suitable for the production of rigid and semi-rigid sheets for ducts, hoods, and like constructions; they are adapted for post-forming.

The resins and blends of the following examples were prepared similarly to the method given for the preparation of Example 1.

EXAMPLE 2

The resin of Example 2 was made from 39 parts methyl methacrylate, 39 parts of styrene, and 22 parts of acrylonitrile. Sixty-five parts was blended with 20 parts of butadiene-acrylonitrile (75:25) copolymer and 15 parts of butadiene-methyl methacrylate (75:25) copolymer.

EXAMPLE 3

This resin was the same as that used in Example 2. Sixty-five parts was blended with 20 parts of the same butadiene-acrylonitrile copolymer and 15 parts of butadiene-styrene (90:10) copolymer.

EXAMPLE 4

In this example everything was the same as in Example 3, except that the butadiene-styrene copolymer was prepared from 70 parts of butadiene and 30 parts of styrene.

EXAMPLE 5

Methyl methacrylate, styrene and acrylonitrile were used in the ratio 39/39/22 to produce the resin. Sixty-five parts of this were blended with 20 parts of butadiene-acrylonitrile (75:25) copolymer and 15 parts of butadiene-styrene (70:30) copolymer.

Physical properties of the blends of Examples 1 and 5 were determined and are recorded in the following table where the meaning of the headings is that given above, except that the impact tests were carried out at different temperatures.

*Physical properties of blends*

| Example No. | Rockwell R | Modulus | Heat Dist. | Flex Life | Izod Impact Strength | | | | |
|---|---|---|---|---|---|---|---|---|---|
| | | | | | Rt | 25° | 30° | 35° | 40° |
| 1 | 55 | 165,000 | 76 | 9 | 4.3 | 2.0 | 1.7 | 1.6 | 1.1 |
| 5 | 57 | 174,000 | 81 | 12 | 6.6 | 6.4 | 5.1 | 1.8 | 1.0 |

The physical properties to which the table refers were all determined according to standard test procedures except for the flex life. For this test, the number of cycles each sample was bent through 180° without cracking is recorded.

The examples are illustrative. The products are all tough, whether in sheet form or in bulk. The blends are suitable for injection molding or extrusion, and are suited for the manufacture of a variety of useful products.

The invention is defined in the following claims. Whe we claim is:

1. A tough plastic blend which is composed of (1) 65 to 85 parts by weight of a polymeric resin of the class consisting of resin formed by copolymerization of 90 to 50 parts per hundred of the resin of methyl methacrylate and 10 to 50 parts acrylonitrile, and resin formed by copolymerization of 10 to 50 parts per hundred of the resin of acrylonitrile and 90 to 50 parts of a mixture of methyl methacrylate and styrene in which there is at least as much methyl methacrylate as styrene, (2) 10 to 20 parts by weight of a rubbery random copolymer of 60 to 90 parts per hundred of the rubber copolymer of a conjugated diene and 40 to 10 parts of monomer of which all but up to 5 parts is from the class consisting of acrylonitrile, methacrylonitrile and ethacrylonitrile, the balance being from the class consisting of acrylonitrile, methacrylonitrile, ethacrylonitrile, methyl methacrylate, vinyl pyridine, methyl vinyl ketone, vinylidene chloride and styrene, and (3) 5 to 15 parts by weight of rubber which is from the class consisting of natural rubber, synthetic homopolymers of conjugated dienes and copolymers of at least 60 percent of a conjugated diene and up to 40 percent of an ethylenically unsaturated monomer of the class consisting of styrene, the mono- and di-nuclearly methylated styrenes, alpha-methylstyrene, methyl methacrylate, ethyl acrylate, vinyl pyridine, methyl vinyl ketone and vinylidene chloride.

2. The blend of claim 1 in which the resin is a copolymer of methyl methacrylate and acrylonitrile.

3. The blend of claim 1 in which component 2 is butadiene-acrylonitrile copolymer.

4. The blend of claim 1 in which the resin is a copolymer of 78 parts methyl methacrylate and 22 parts of acrylonitrile.

5. The blend of claim 1 in which the resin is a copolymer of substantially 72 parts methyl methacrylate and 28 parts of acrylonitrile, 65 parts of which are blended with 20 parts of butadiene-acrylonitrile (60:40) copolymer and 15 parts of butadiene-styrene (70:30) copolymer.

6. The blend of claim 1 in which the resin, said rubbery random copolymer and said other rubber are present in substantially the ratio of 65:20:15.

7. The blend of claim 1 in which the resin, said rubbery random copolymer and said other rubber are present in substantially the ratio of 75:15:10.

8. The blend of claim 1 in which the resin, said rubbery random copolymer and said other rubber are present in substantially the ratio of 85:10:5.

References Cited in the file of this patent

UNITED STATES PATENTS

| | | |
|---|---|---|
| 2,713,566 | Reid | July 19, 1955 |
| 2,802,808 | Hayes | Aug. 13, 1957 |

FOREIGN PATENTS

| | | |
|---|---|---|
| 644,022 | Great Britain | Oct. 4, 1950 |